Figure 1:
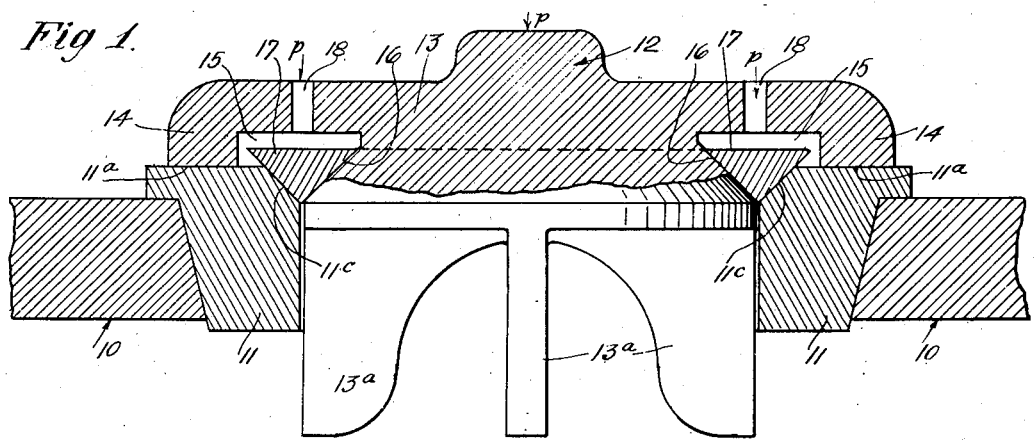

Oct. 16, 1928.

W. W. WILSON ET AL 1,687,745

PUMP VALVE

Filed Aug. 18, 1925

Inventors
Robert R. Shull
Grover C. Deakins
William Webster Wilson
Attorney

Patented Oct. 16, 1928.

1,687,745

UNITED STATES PATENT OFFICE.

WILLIAM WEBSTER WILSON, OF LOS ANGELES, GROVER C. DEAKINS, OF ANAHEIM, AND ROBERT R. SHULL, OF LONG BEACH, CALIFORNIA.

PUMP VALVE.

Application filed August 13, 1925. Serial No. 50,910.

This invention relates generally to valves, and although the specific and illustrative embodiment of the invention herein set out has been particularly designed with a view to automatically operating valves such as are used in pumps operating at considerable pressure, it will be readily understood that the invention is not at all limited to such uses. It will be useful, however, to describe the illustrative embodiment of the invention as used in pumps operating under some pressure and also particularly where the fluid is liable to cut the valves; for from such description the invention itself will be most readily understandable.

In pumps such as fluid circulation pumps used in rotary drilling rigs, the fluid pumped carries in suspension a large amount of finely divided solid; in fact, as is well known, it is the circulation of this water that carries the drillings out of the well. In order to keep up circulation the pumps are operated at comparatively high pressures, for instance at 400 lbs. per square inch, and this high pressure exerting itself upon the valves causes them to seat so heavily that the finely divided solid matter carried by the water is pressed into the valves, abrading them so that as a rule such valves have a comparatively short life and must be often renewed.

The standard type of valve that has been heretofore used has usually embodied a valve disk of some four or five inches in diameter, that seats on its under side and near its periphery on a valve seat ring. The total pressure upon a valve of that diameter is very large; and that total pressure is exerted to press the disk upon the seat. Due to the fact that the circulating water carries solids in suspension, it is necessary that the disk be made of some material that will seat tightly in spite of the fact that there will always be some of this finely divided solid material between it and the seat; and the resultant necessary limitations of the material used in the disk render it easily scored and abraded.

A primary object of this invention is the provision of a simple and practicable form of valve that although having the same diameter and capacity as previous valves, relieves the seating or sealing portions of the valve from the heavy pressures to which they have formerly been subjected; and speaking in a general way, this object is accomplished by making the valve proper in two parts, one part of which may be termed a valve body and the other the sealing member or ring; the two being constructed and arranged so that the valve body (which is not depended upon for any sealing effect) takes the major portion of the pressure while the sealing member or ring takes only such pressure as is necessary to bring it into good seating and sealing contact with the seating surface.

Figure 2:
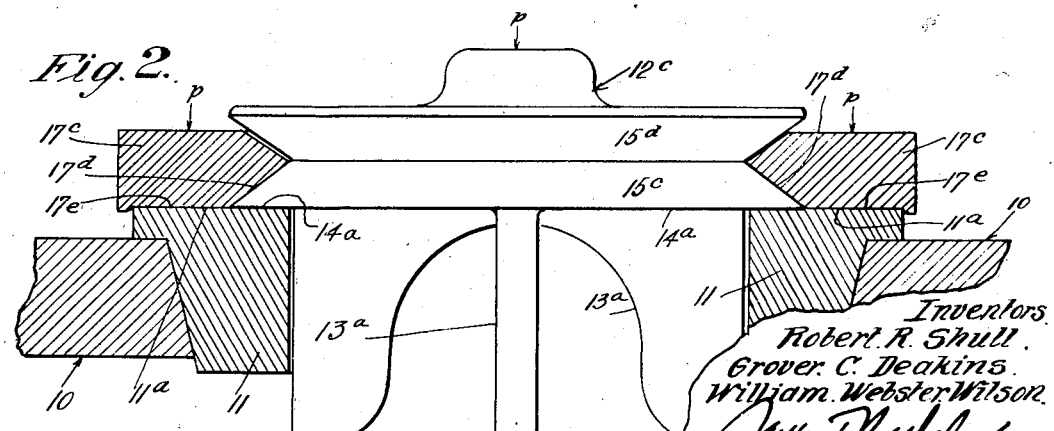

With the foregoing in view the invention will now be best understood from the following description in detail of a preferred and specfic illustrative embodiment of the invention, reference being had for this purpose to the accompanying drawings, in which Fig. 1 is the central section of one form of our improved valve; and Fig. 2 is a similar view of a modified form.

It will be understood that in giving a detailed description of the preferred forms of our valve, we do so not for the purpose of limiting our invention to such specific and preferred forms, but for the purpose of giving a clear and full understanding of our invention through the medium of a full and detailed understanding of specific forms thereof.

Referring first to the form shown in Fig. 1 of the drawings, there is illustrated a member 10 which forms a part of the stationary structure of the pump, being what is ordinarily known as the valve plate. This plate forms, in effect, one wall of the valve chamber in a pump, and usually there is inserted in this plate a valve seat 11 made of a suitable selected material, the walls of the valve box and other parts of the pump usually being made of cast iron. So far as the purposes of our invention are concerned, the parts 10 and 11 may be viewed as forming the relatively stationary part of the valve and providing a seat upon which the sealing member or ring is seated when the valve is closed.

In the form shown in Fig. 1 the valve body 12 is made up somewhat in the usual manner excepting that we prefer to make the head or head flange 13 and the guide portions 13ª integral instead of in two pieces, as is usually the case. This, however, is not necessary, although the integral structure of the valve body eliminates all liability of the otherwise separate parts from coming loosened. At its periphery this valve body has a downwardly facing peripheral flange 14 that when the valve is closed seats downwardly on the upper flat face 11ª of valve seat 11. Immediately within this peripheral flange there is an annular recess 15, the outer wall of the recess being formed by the overhanging flange 14 and the inner wall of the recess being, in the form of Fig. 1, an angular or conical surface 16, as is clearly shown in Fig. 1. When the valve is closed the parts are in the relative positions shown in Fig. 1; and the conical face 16 extends to a point below the upper flat face 11ª of valve seat 11. The inner upper corner or edge of valve seat 11 is beveled away to form a conical face 11ᶜ as illustrated; and the two beveled conical faces 11ᶜ and 16 take between them the sealing ring 17, which has its under side or surface formed with two conical faces corresponding in angularity to the faces 11ᶜ and 16.

Ring 17 is preferably somewhat loose in recess 15; or at least loose to the extent that it may move vertically (assuming the action of the valve body to involve vertical movement to and from the seat). The sealing ring may or may not be loose radially when it is not under pressure and thus not confined between the conical faces 11ᶜ and 16. Openings 18 allow fluid pressure to enter recess 15 and thus to press against the upper surface of sealing ring 17.

When the valve is in operation the greater part of the fluid pressure is borne by the valve body itself, this pressure being supported by the seating of flange 14 on the valve seat 11. As the valve moves down to close sealing ring 17 is more or less loose in its recess 15; and when the valve is closed it will be seen that the only pressure exerted directly upon the sealing ring is the fluid pressure exerted directly upon its upper face. Such pressure is only a small fraction of the total fluid pressure exerted upon the whole valve; but that comparatively greatly reduced pressure is amply sufficient to hold the sealing ring down in fluid tight engagement with the two surfaces 11ᶜ and 16. The valve body itself thus takes the major portion of the pressure load; and although solid particles may constantly find lodgment between seating flanges 14 and seat 11, their presence is of no great consequence in the operation of our valve, as it is not at all necessary that a fluid tight engagement be formed where the flange 14 seats on seat 11. Neither is their presence of any great consequence as regards wear, because the flange or the valve body as well as the seat 11 may be constructed of a suitable material hard and tough enough not to be materially worn by the solid particles.

And whether or not fluid carrying matter in suspension is being pumped, our valve still has certain advantages due to relief of pressure from the sealing element. It is not only the presence of suspended abrading matter that causes deterioration of valves, but also such deterioration is caused by the valves pounding upon their sealing surfaces under the great pressures imposed. In our valve all these pounding effects are most largely taken by the valve body itself, upon which no dependence is placed for sealing, and very little is taken by the sealing ring. In valves that are subjected to nothing but clear liquid, the sealing ring 17 may be made of any suitable material, of suitable metal for instance. But in typical instances where solids in suspension are passing through the valve, it is necessary, as we have before stated, that one or the other of the members that by their contact seal the valve shall be made of a material that can yield sufficiently to form an effective seal in spite of the presence of solid particles. Thus in such a case, we prefer to make sealing ring 17 of rubber or suitable rubber composition or similar material; in general, of a material that is yielding and also preferably of a material that is resilient.

In the form shown in Fig. 2 the annular recess in valve body 12ᶜ is in the form of a peripheral groove, having a lower conical or angular wall 15ᶜ. The upper wall 15ᵈ of this recess groove may also be similarly conical, thus giving to the recess V-shaped cross sectional characteristics; and the sealing ring 17ᶜ is seated, preferably more or less loosely, in this annular groove with an inner lower conical face 17ᵈ adapted to seat on face 15ᶜ. The sealing ring also has exterior of the valve body a flat downwardly facing sealing face 17ᵉ that seats upon the upwardly facing flat sealing face 11ª of seat 11. The valve body here takes the major portion of the imposed pressure by its downwardly facing peripheral surface 14ª, seating upon the inner part of upper face 11ª of seat 11. The action of this valve is substantially similar to that of the form before described, the valve body taking the major parts of the pressure while the sealing ring takes only that part of the pressure which is directly imposed upon it. In every case, the proportionate pressures taken by the valve body and sealing ring depend upon their proportionate areas exposed to the fluid pressure at the outlet or delivery side of the valve. In the form of Fig. 2, as in the other form, sealing ring 17ᶜ is preferably somewhat loosely mounted in its receiving recess, or at least loosely to the extent that it may move vertically with reference to the valve body. This looseness of mounting in both forms does not necessarily mean that the sealing rings can be loosely moved by hand or by ordinary pressures or force. For instance, the rings if made of rubber may be expanded to be put into place and they may grip the inner walls of their receiving recess more or less tightly; but when the heavy operating pressures are put upon their upper faces, they can move downwardly in engagement with their conical seating surfaces because, being expansible, they will expand sufficiently to allow them to move bodily downwardly with reference to the valve body. Of course, in cases where the sealing rings may be made of a comparatively unexpansible material, such as metal, the sealing ring could not, particularly in the form of Fig. 2, fit tightly radially into the angular wall recess groove. In Fig. 2 the rubber ring may overhang the edge of the seat so that, under pressure, it will more or less conform around the edge corner of the seat, thus making a tighter joint and hold fluid pressure even though foreign matter may be beneath the rubber sealing member.

We claim:

1. In a valve, a relatively stationary part including a seat member, a valve body adapted to seat on the stationary part and having an annular recess with a conical wall, a sealing member loosely carried in the recess and free to move bodily with relation to the body in the direction of movement of the body to and from the stationary part, said sealing member having a conical face adapted to seat on said conical wall of the recess and the sealing member also being adapted to seat on the stationary part.

2. In a valve, a relatively stationary part including a seat member, a valve body adapted to seat on the stationary part and having an annular recess with a conical wall, a sealing member carried in the recess and free to move bodily with relation to the body in the direction of movement of the body to and from the stationary part, said sealing member having a conical face adapted to seat on said conical wall of the recess and having another face adapted to seat on the stationary part.

3. In a valve, a relatively stationary part including a seat member, a valve body adapted to seat on the stationary part and having an annular recess with a conical wall, a sealing member carried in the recess and free to move bodily with relation to the body in the direction of movement of the body to and from the stationary part, said sealing member having a conical face adapted to seat on said conical wall of the recess and having a flat face adapted to seat on the stationary part.

4. In a valve, a relatively stationary part including a seat member, a valve body adapted to seat on the stationary part and having an annular and substantially V-shaped recess, a sealing ring loosely carried in the recess and having oppositely inclining conical inner peripheral faces opposing the walls thereof, said ring being free to move bodily with relation to the body in the direction of movement of the body to and from the stationary part, the sealing member being adapted to seat on the stationary part with one of its conical faces seated on the associated wall of the recess; the sealing ring being exposed to the pressure existing at the delivery side of the valve body.

5. In a valve, a valve body having an annular recess with a conical wall, and a sealing member loosely carried in the recess and free to move bodily with relation to the body in the direction of the stroke of the valve, said sealing member having a conical face adapted to seat on said conical wall of the recess.

6. In a valve, a valve body having an annular and substantially V-shaped recess, and a sealing ring loosely carried in the recess and having conical inner peripheral faces opposing the walls thereof, said sealing member being free to move bodily in the direction of the stroke of the valve.

7. In a valve, a relatively stationary part including a seat member, a valve body adapted to seat on the stationary part and having an annular and substantially V-shaped recess, a sealing ring carried in the recess and having conical inner peripheral faces opposing the walls thereof, said ring being free to move bodily with relation to the body in the direction of movement of the body to and from the stationary part, one of said conical faces being adapted to seat on the associated conical wall of the recess, and said ring having another face adapted to seat on the stationary part.

8. In a valve, a relatively stationary part including a seat member, a valve body adapted to seat on the stationary part and having an annular and substantially V-shaped recess, a sealing ring carried in the recess and having conical inner peripheral faces opposing the walls thereof, said ring being free to move bodily with relation to the body in the direction of movement of the body to and from the stationary part, one of said conical faces being adapted to seat on the associated conical wall of the recess, and said ring having a flat face adapted to seat on the stationary part.

In witness that we claim the foregoing we have hereunto subscribed our names this 31st day of July 1925.

WILLIAM WEBSTER WILSON.
GROVER C. DEAKINS.
ROBERT R. SHULL.